(12) United States Patent
Tateishi

(10) Patent No.: US 9,398,247 B2
(45) Date of Patent: Jul. 19, 2016

(54) AUDIO VOLUME CONTROL DEVICE, CONTROL METHOD AND PROGRAM

(75) Inventor: Kazuya Tateishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/127,772

(22) PCT Filed: Jul. 19, 2012

(86) PCT No.: PCT/JP2012/004588
§ 371 (c)(1),
(2), (4) Date: Dec. 19, 2013

(87) PCT Pub. No.: WO2013/014886
PCT Pub. Date: Jan. 31, 2013

(65) Prior Publication Data
US 2014/0313417 A1    Oct. 23, 2014

(30) Foreign Application Priority Data

Jul. 26, 2011    (JP) ................................ 2011-162789

(51) Int. Cl.
| H04N 5/60 | (2006.01) |
| H04N 21/422 | (2011.01) |
| H04N 21/439 | (2011.01) |
| H04N 21/44 | (2011.01) |
| H04N 21/45 | (2011.01) |
| H04N 21/4223 | (2011.01) |
| H04N 21/442 | (2011.01) |

(52) U.S. Cl.
CPC ............ *H04N 5/60* (2013.01); *H04N 21/4223* (2013.01); *H04N 21/42203* (2013.01); *H04N 21/4394* (2013.01); *H04N 21/4396* (2013.01); *H04N 21/44008* (2013.01); *H04N 21/44218* (2013.01); *H04N 21/4532* (2013.01)

(58) Field of Classification Search
USPC ......................... 725/10, 12; 348/734; 381/104
See application file for complete search history.

(56) References Cited

U.S. PATENT DOCUMENTS

| 6,353,764 B1 * | 3/2002 | Imagawa ................ G06F 3/017 700/1 |
| 7,298,930 B1 * | 11/2007 | Erol et al. ...................... 382/305 |
| 7,669,215 B2 * | 2/2010 | Tsunokawa et al. ............ 725/46 |

(Continued)

FOREIGN PATENT DOCUMENTS

| EP | 2 333 778 A1 | 6/2011 |
| JP | 2006-005418 A | 1/2006 |

(Continued)

OTHER PUBLICATIONS

International Search Report issued Oct. 23, 2012 in PCT/JP2012/004588.

(Continued)

*Primary Examiner* — Brian Yenke
(74) *Attorney, Agent, or Firm* — Oblon, McClelland, Maier & Neustadt, L.L.P

(57) ABSTRACT

An information processing apparatus includes a processor that receives captured image data and captured sound data corresponding to an environment in which content is reproduced and detects a user based on the captured image data and analyzes a situation of the environment based on a result of the detection and the captured sound data and controls an audio volume corresponding to reproduced content based on a result of the analyzing.

20 Claims, 10 Drawing Sheets

(56) References Cited

U.S. PATENT DOCUMENTS

| | | | |
|---|---|---|---|
| 8,031,891 B2* | 10/2011 | Ball | H04H 60/45 381/303 |
| 8,041,025 B2* | 10/2011 | Dolph et al. | 379/390.01 |
| 8,243,141 B2* | 8/2012 | Greenberger et al. | 348/155 |
| 8,347,325 B2* | 1/2013 | Price | H04H 60/45 725/10 |
| 8,595,793 B2* | 11/2013 | Kashyap et al. | 726/3 |
| 8,634,701 B2* | 1/2014 | Kang et al. | 386/248 |
| 8,640,021 B2* | 1/2014 | Perez et al. | 715/203 |
| 8,645,985 B2* | 2/2014 | Deshpande | A63F 13/00 706/11 |
| 8,694,495 B2* | 4/2014 | Saito et al. | 707/732 |
| 8,712,110 B2* | 4/2014 | Eckhoff | G06K 9/00221 345/1.3 |
| 8,719,019 B2* | 5/2014 | Do et al. | 704/246 |
| 8,793,727 B2* | 7/2014 | Serdiuk | 725/36 |
| 8,797,465 B2* | 8/2014 | Hardacker et al. | 348/734 |
| 2002/0144259 A1* | 10/2002 | Gutta et al. | 725/10 |
| 2003/0063222 A1* | 4/2003 | Creed et al. | 348/687 |
| 2003/0088188 A1* | 5/2003 | Maeda et al. | 600/547 |
| 2003/0133551 A1* | 7/2003 | Kahn | 379/102.03 |
| 2006/0258396 A1* | 11/2006 | Matsuoka | 455/556.1 |
| 2007/0076131 A1* | 4/2007 | Li et al. | 348/738 |
| 2007/0111657 A1* | 5/2007 | Yamada et al. | 455/3.01 |
| 2007/0127737 A1* | 6/2007 | Lee | 381/94.3 |
| 2007/0132888 A1* | 6/2007 | Okamoto et al. | 348/687 |
| 2007/0300259 A1* | 12/2007 | Chan | 725/46 |
| 2008/0001773 A1* | 1/2008 | Rye et al. | 340/825.22 |
| 2008/0100747 A1* | 5/2008 | Lin et al. | 348/553 |
| 2009/0016540 A1* | 1/2009 | Heningsen Nielsen | H03G 1/02 381/56 |
| 2009/0169023 A1* | 7/2009 | Wang | 381/57 |
| 2009/0244402 A1* | 10/2009 | Rye et al. | 348/734 |
| 2009/0322915 A1* | 12/2009 | Cutler | 348/251 |
| 2009/0323981 A1* | 12/2009 | Cutler | 381/92 |
| 2010/0020988 A1* | 1/2010 | McLeod | 381/107 |
| 2010/0107184 A1* | 4/2010 | Shintani | 725/10 |
| 2010/0112945 A1* | 5/2010 | Hanif | 455/41.2 |
| 2010/0188279 A1* | 7/2010 | Shamilian et al. | 341/176 |
| 2010/0239101 A1 | 9/2010 | Okamura et al. | |
| 2011/0054909 A1* | 3/2011 | Bruekers et al. | 704/275 |
| 2011/0154385 A1 | 6/2011 | Price et al. | |
| 2011/0164188 A1* | 7/2011 | Karaoguz et al. | 348/734 |
| 2011/0214141 A1* | 9/2011 | Oyaizu | 725/12 |
| 2012/0069242 A1* | 3/2012 | Pearlstein | G10K 11/1788 348/484 |
| 2012/0114137 A1* | 5/2012 | Tsurumi | 381/92 |
| 2012/0195447 A1* | 8/2012 | Hiruma et al. | 381/306 |
| 2012/0224043 A1 | 9/2012 | Tsurumi | |
| 2012/0271632 A1* | 10/2012 | Do et al. | 704/246 |
| 2012/0324492 A1* | 12/2012 | Treadwell et al. | 725/10 |
| 2013/0047175 A1* | 2/2013 | Ramirez Flores | H04H 60/45 725/12 |
| 2013/0086602 A1* | 4/2013 | Mikan et al. | 725/10 |
| 2013/0125154 A1* | 5/2013 | Price et al. | 725/10 |
| 2013/0188007 A1* | 7/2013 | Duong | 348/14.08 |

FOREIGN PATENT DOCUMENTS

| | | |
|---|---|---|
| JP | 2007-228385 | 9/2007 |
| JP | 2008-53986 | 3/2008 |
| JP | 2009-060220 A | 3/2009 |
| JP | 2009-088626 | 4/2009 |
| JP | 2009-088626 A | 4/2009 |
| JP | 2010-011015 A | 1/2010 |
| JP | 2010-028783 A | 2/2010 |
| JP | 2010-154388 A | 7/2010 |
| JP | 2010-268284 A | 11/2010 |
| JP | 2012-186622 A | 9/2012 |

OTHER PUBLICATIONS

Supplementary European Search Report, dated Jan. 30, 2015 in Application No. 12817918.1-1905 / 2737692 (7 pages).
Office Action issued in corresponding Japanese Patent Application No. 2011-162789 mailed Aug. 6, 2015.

* cited by examiner

FIG. 9

| ENVIRONMENTAL SOUND | DETERMINATION RESULT OF ENVIRONMENTAL SOUND | NUMBER OF DETECTED FACES | DIRECTION OF SOUND SOURCE AND DIRECTION OF LOCATION WHERE FACE IS DETECTED | EXAMPLE OF SURROUNDING SITUATION | SOUND OUTPUT CONTROL |
|---|---|---|---|---|---|
| RINGING TONE OF INTERPHONE OR TELEPHONE | NON-VOICE | 0 | | MERELY HEARING. WANT TO STABLY HEAR SOUND | TURN UP VOLUME |
| | NON-VOICE | ONE OR MORE | | WATCHING TV. IT WANT TO STABLY HEAR SOUND | TURN UP VOLUME OR INCREASE BAND |
| VOICE SUCH AS CONVERSATION OR THE LIKE | VOICE | 0 | | NOT WATCHING TV. TALKING (TELEPHONE?) | TURN DOWN VOLUME |
| | VOICE | ONE OR MORE | COINCIDENT | USER WATCHING TV IS TALKING (TELEPHONE?) | NO ADJUSTMENT |
| | VOICE | ONE OR MORE | NOT COINCIDENT | USER WATCHING TV AND TALKING USER EXIST INDIVIDUALLY | TURN UP VOLUME OR INCREASE BAND |
| NIGHTTIME | | | | | TURN DOWN VOLUME OR REDUCE BAND |

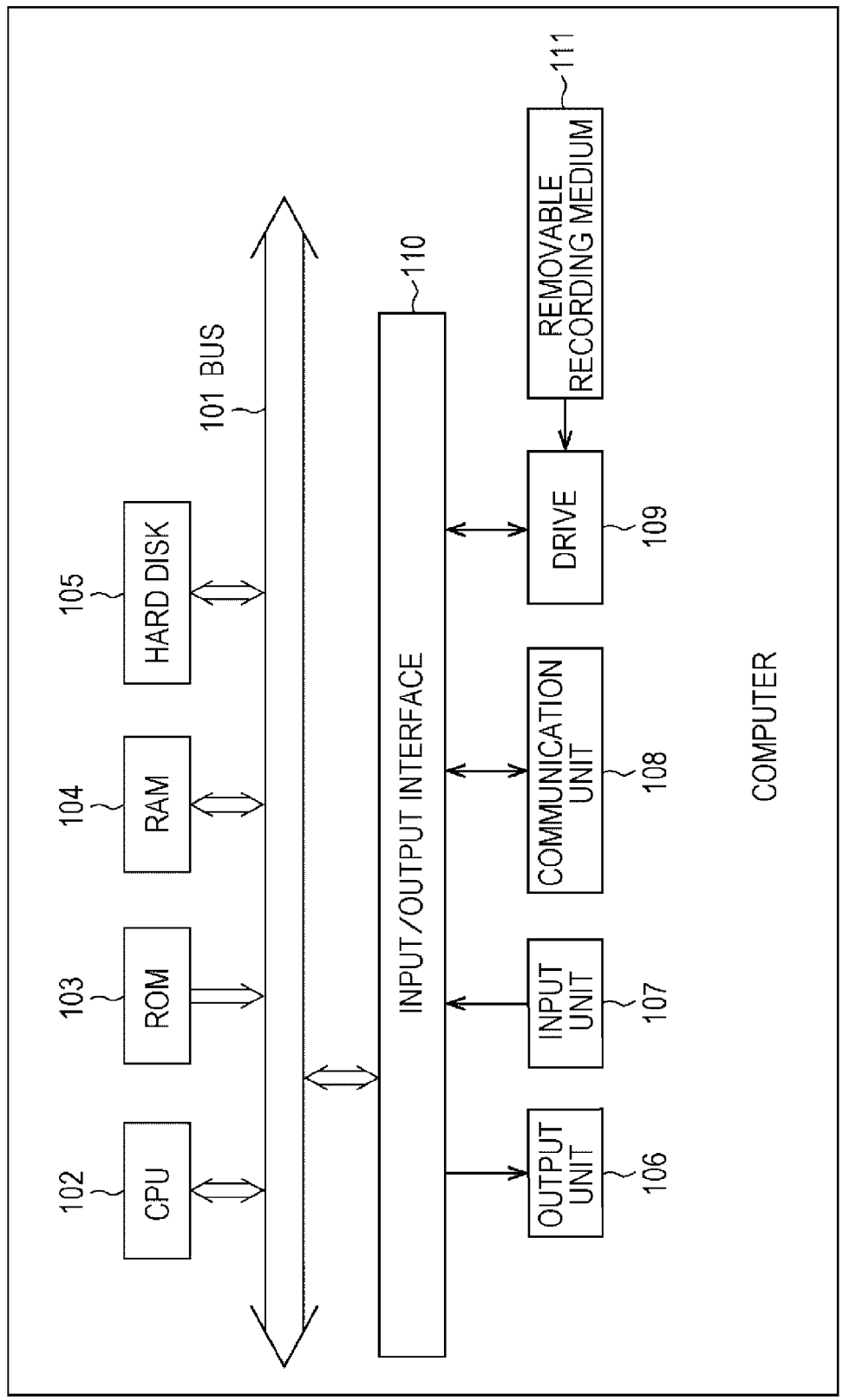

AUDIO VOLUME CONTROL DEVICE, CONTROL METHOD AND PROGRAM

TECHNICAL FIELD

The present technology relates to a control device, a control method and a program, and particularly to a control device, a control method and a program that enable proper control of the output of a sound from an output device for outputting at least a sound such as a TV (television receiver) or the like.

BACKGROUND ART

For example, Patent Document 1 describes a TV that detects surrounding noise information, determines whether there is a viewer or not from an image of a camera for taking a surrounding image, and suppresses noise based on the noise information when there is a viewer.

Furthermore, for example, Patent Document 2 describes a recording and reproducing device that generates content analysis information based on an audio signal of contents, generates environmental noise analysis information based on surrounding noise and adjusts volume of an audio signal of the contents based on the content analysis information and the environmental noise analysis information.

CITATION LIST

Patent Literature

PTL 1: Japanese Patent Application Laid-Open No. 2010-268284
PTL 2: Japanese Patent Application Laid-Open No. 2010-154388

SUMMARY OF INVENTION

Technical Problem

When a user who is watching a program on a TV hears talking a voice around the TV but the talking voice is not produced from the user, that is, the voice is a voice from a telephone conversation which a family member living together or the like has at a place out of the room where the TV is located, the telephone conversation is noise for the user watching the program, and makes it difficult to hear the sound (voices) of the program. Accordingly, in this case, it is desired to adjust the output of the sound of the TV, that is, turn up the volume of the TV so that the user watching the program can easily hear the sound of the program on the TV.

On the other hand, when the talking voice heard around the TV is a voice produced from the user watching the program on the TV, the user watching the program produces a voice by himself/herself. Therefore, it is not necessary to adjust the output of the sound of the TV so as to allow the user watching the program to easily hear the sound of the program on the TV.

As described above, even when a voice is heard around the TV, there are a case where it is proper to adjust the output of the sound from the TV and a case where it is proper not to adjust the output of the sound from the TV.

The present technology has been completed in view of such circumstances, and enables proper control of the output of the sound from an output device for outputting at least a sound such as a TV or the like.

Solution to Problem

According to an aspect of the present technology, there is provided an information processing apparatus comprising: a processor that: receives captured image data and captured sound data corresponding to an environment in which content is reproduced; detects a user based on the captured image data; analyzes a situation of the environment based on a result of the detection and the captured sound data; and controls an audio volume corresponding to reproduced content based on a result of the analyzing.

A method according to another aspect of the present technology includes the steps of: receiving captured image data and captured sound data corresponding to an environment in which content is reproduced; detecting a user based on the captured image data; analyzing a situation of the environment based on a result of the detection and the captured sound data; and controlling an audio volume corresponding to reproduced content based on a result of the analyzing.

In the aspects described above, the processor receives the captured image data from a camera positioned in the environment in which content is reproduced and detects a face based on the captured image data.

The control device may be an independent device or an internal block constituting one device.

The program may be provided by being transmitted via a transmission medium or recorded in a recording medium.

Advantageous Effects of Invention

According to the present technology, the output of the sound from the output device can be properly controlled.

BRIEF DESCRIPTION OF DRAWINGS

FIG. 9 is a diagram explaining another example of the sound output control executed by the volume/gain controller 35.

FIG. 10 is a block diagram illustrating a configuration example of an embodiment of a computer to which the present technology is applied.

MODE FOR CARRYING OUT

Embodiment of TV to which Present Technology is Applied

Figure 1:
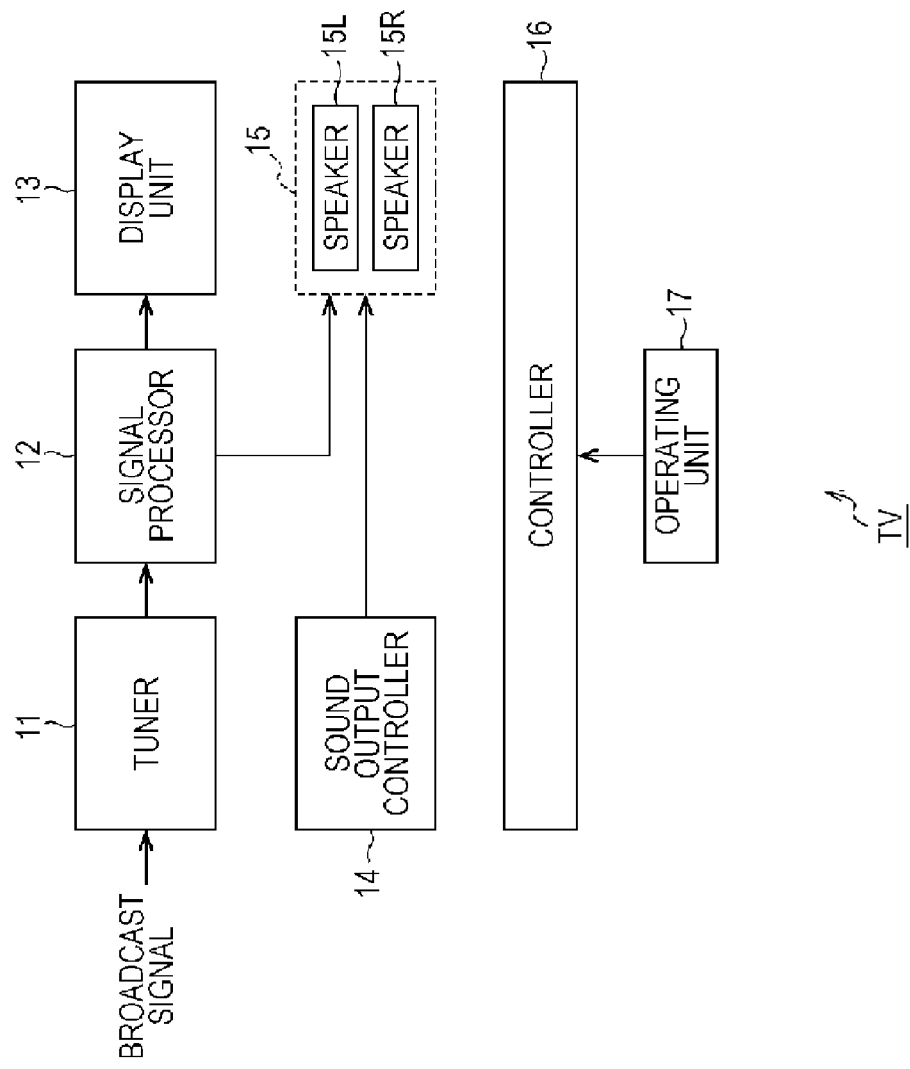
FIG. 1 is a block diagram illustrating a configuration example of an embodiment of a TV to which the present technology is applied.

FIG. 1 is a block diagram illustrating a configuration example of an embodiment of a TV to which the present technology is applied.

In FIG. 1, a TV is one of output devices for outputting at least a sound, and has a tuner 11, a signal processor 12, a display unit 13, a sound output controller 14, a speaker unit 15, a controller 16 and an operating unit 17.

The tuner 11 is supplied with an RF (Radio Frequency) signal of a television broadcast signal received by an antenna (not shown).

The tuner 11 detects and demodulates the RF signal supplied thereto, achieves data of a program of a channel that is selected by, for example, user's operation of the operating unit 17, and supplies the data to the signal processor 12.

The signal processor 12 performs decoding and other necessary signal processing on the data of the program from the tuner 11, supplies resultant video (image) data of the program to the display unit 13 and also supplies audio (sound (voice)) data of the program to the speaker unit 15.

The display unit 13 includes, for example, an LCD (Liquid Crystal Display), an organic EL (Electro Luminescence) or the like, and displays images of the program corresponding to the video data from the signal processor 12.

The sound output controller 14 takes an image around the TV and collects an environmental sound around the TV, and controls the output of the sound from the TV, that is, for example, the volume or the like of (speakers 15L and 15R of) the speaker unit 15 based on the resultant taken image around the TV and the resultant environmental sound around the TV.

The speaker unit 15 has the speaker 15L for outputting the sound of an L (Left) channel and the speaker 15R for outputting the sound of an R (Right) channel, and outputs the sound of the program corresponding to the audio data from the signal processor 12 according to the control of the sound output controller 14.

The controller 16 controls each of blocks constituting the TV according to an operation of the operating unit 17 or the like, for example.

The operating unit 17 is a button provided on a housing (main body) of the TV, a remote commander, or the like, and is operated by the user to supply the controller 16 with the operation signal corresponding to the operation concerned.

<Configuration Example of Sound Output Controller 14>

Figure 2:
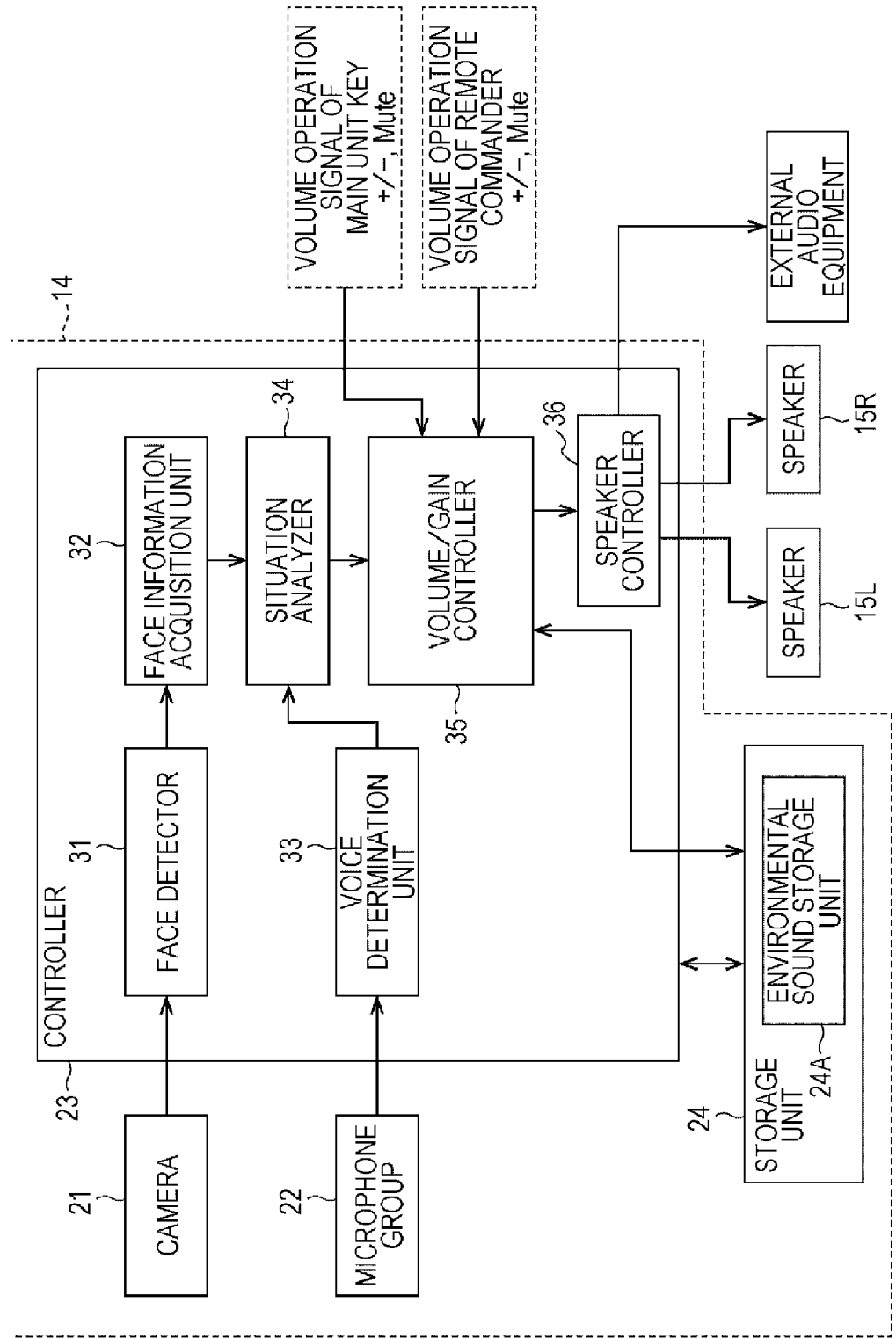
FIG. 2 is a block diagram illustrating a configuration example of a sound output controller 14.

FIG. 2 is a block diagram illustrating a configuration example of the sound output controller 14 of FIG. 1.

In FIG. 2, the sound output controller 14 has a camera 21, a microphone (microphone) group 22, a controller 23 and a storage unit 24.

The camera 21 takes a surrounding image around the TV (particularly, at a side opposite to the display screen of the display unit 13, for example) at a predetermined rate, and supplies a resultant taken image to (a face detector 31 of) the controller 23.

The microphone group 22 has plural microphones, collects an environmental sound around the TV and supplies the environmental sound to (a voice determination unit 33 of) the controller 23.

The controller 23 controls the output of the sound from the TV such as the volumes of the speakers 15L and 15R of the speaker unit 15 based on the taken surrounding image around the TV from the camera 21 and the environmental sound around the TV from the microphone group 22.

That is, the controller 23 has the face detector 31, a face information acquisition unit 32, the voice determination unit 33, a situation analyzer 34, a volume/gain controller 35 and a speaker controller 36.

The face detector 31 detects a face (of a person) on a taken image supplied from the camera 21, and supplies the face information acquisition unit 42 with face detection information representing the detection result.

The face information acquisition unit 32 obtains face information concerning the face on the taken image based on the face detection information or the like from the face detector 31, and supplies the face information to the situation analyzer 34.

That is, the face information acquisition unit 32 recognizes the positions (for example, the positions on the taken image) and the number of faces displayed on the taken image as face information, for example, from the face detection information.

In addition, the face information acquisition unit 32 carries out individual identification on a face displayed on the taken image to obtain information for identifying who has the identified face (whose face is the identified face), and the age, gender and the like of the person identified by the individual identification as face information. For example, information necessary for individual identification of family members can be input at the initialization stage of the TV or the like.

The voice determination unit 33 executes frequency analysis or the like on the environmental sound supplied from the microphone group 22 to detect the level (gain) of the environmental sound and the direction to a sound source producing the environmental sound, and also determines whether the environmental sound is a human's voice or a sound other than a human's voice (hereinafter referred to as "non-voice").

The voice determination unit 33 supplies the level of the environmental sound, the direction to the sound source producing the environmental sound and the determination result indicating whether the environmental sound is a voice or a non-voice to the situation analyzer 34 as environmental sound information concerning the environmental sound.

The situation analyzer 34 analyzes the situation around the TV based on the face information supplied from the face information acquisition unit 32 obtained from the taken image, and the environmental sound information supplied from the voice determination unit 33 obtained from the environmental sound, and supplies the situation around the TV obtained as an analysis result (hereinafter referred to as "surrounding situation") to the volume/gain controller 35.

The volume/gain controller 35 controls the speaker controller 36 according to the surrounding situation from the situation analyzer 34, thereby controlling the output of the sound of the TV, that is, for example, the volumes of the speakers 15L and 15R, the gain of the sound output from the speakers 15L and 15R and the like.

The volume/gain controller 35 further controls the output of the sound of the TV according to the user's operation of the operating unit 17 (FIG. 1).

That is, buttons (keys) of the main body as the operating unit 17 and buttons of the remote commander are provided with sound adjustment keys operated to adjust the output of the sound from the TV such as a volume key operated to turn up or down the volume, a mute key operated to mute the sound and the like.

When the user operates the volume adjustment key of the operating unit 17, the controller 16 supplies the volume/gain controller 35 with a volume operation signal that is an operation signal corresponding to the operation of the volume adjustment key.

The volume/gain controller 35 controls the output of the sound of the TV according to the volume operation signal supplied from the controller 16 (from FIG. 1) as well as the surrounding situation from the situation analyzer 34.

The volume/gain controller 35 can further control the output of the sound of the TV according to information stored in the storage unit 24 as described later.

The speaker controller 36 controls the volumes of the speakers 15L and 15R according to the control from the volume/gain controller 35.

External audio equipment is connected to the TV, and when the sound of a program is output from a speaker of the external audio equipment, the speaker controller 36 can control the volume of the speaker of the external audio equipment connected to the TV according to the control from the volume/gain controller 35.

The storage unit 24 stores information necessary for the operation of the controller 23.

A partial storage area of the storage unit 24 serves as an environmental sound storage unit 24A for temporarily storing the environmental sound collected by the microphone group 22.

The environmental sounds collected by the microphone group 22 are supplied to the environmental sound storage unit 24A via the controller 23. The environmental sound storage unit 24A stores the environmental sound from the microphone group 22, and when the environmental sound storage unit 24A stores the environmental sounds amount of which corresponds to the storage capacity thereof, an environmental sound which is newly supplied from the microphone group 22 is stored so as to be overwritten on the oldest environmental sound.

Accordingly, the latest environmental sound for a predetermined time period (for example, several tens seconds or the like) is stored in the environmental sound storage unit 24A at all times.

<Sound Output Control Processing>

Figure 3:
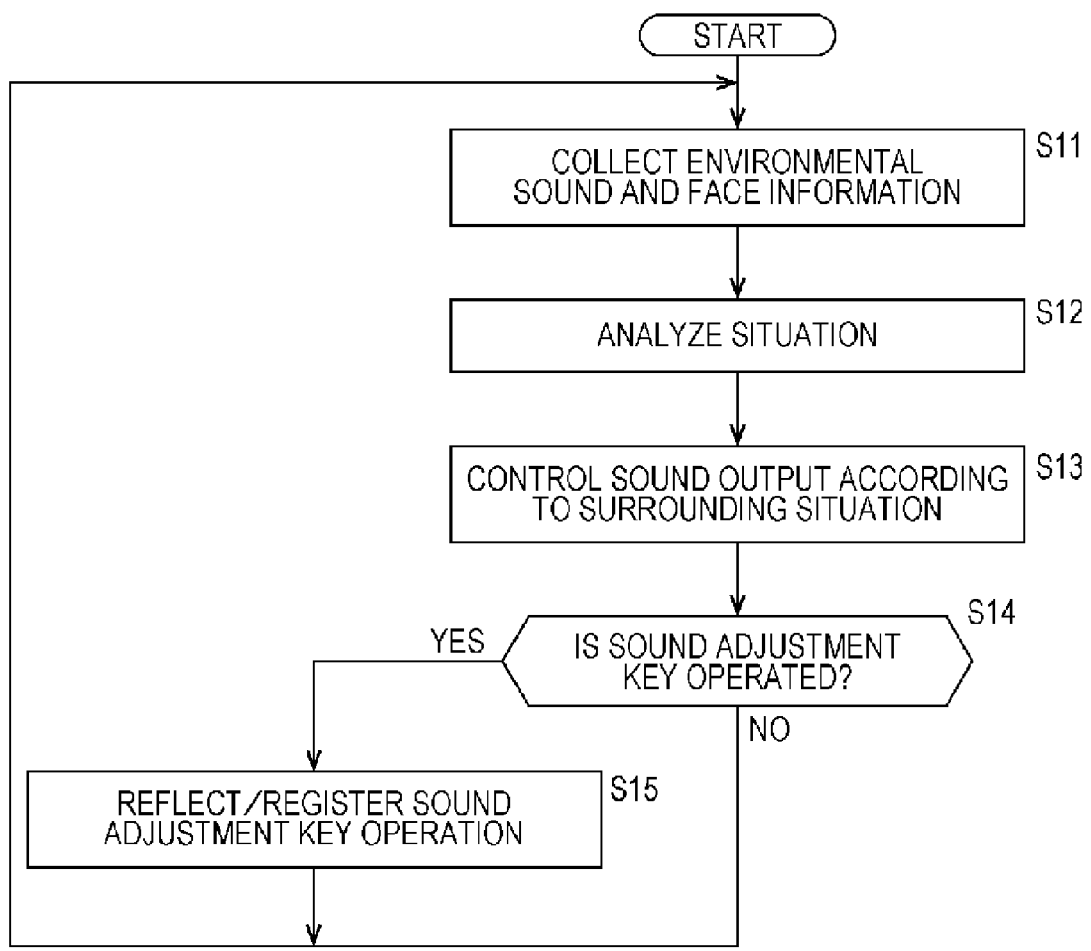
FIG. 3 is a flowchart explaining processing carried out by the sound output controller 14.

FIG. 3 is a flowchart explaining processing carried out by the sound output controller 14 of FIG. 2.

In step S11, the sound output controller 14 collects environmental sound information and face information, and the processing goes to step S12.

That is, by the camera 21, a surrounding image around the TV is taken, and the resultant taken image is supplied to the face detector 31.

The face detector 31 detects a face displayed on the taken image supplied from the camera 21, and supplies face detection information representing the detection result to the face information acquisition unit 32.

Based on the face detection information from the face detector 31 or the like, the face information acquisition unit 32 obtains, for example, the positions, the number and the like of faces displayed on a taken image as face information concerning the faces displayed on the taken image, and supplies the obtained face information to the situation analyzer 34.

On the other hand, an environmental sound around the TV are collected by the microphone group 22 and supplied to the voice determination unit 33.

The voice determination unit 33 detects the level of the environmental sound supplied from the microphone group 22 and the direction to a sound source producing the environmental sound, and also determines whether the environmental sound is a voice or a non-voice.

The voice determination unit 33 supplies the situation analyzer 34 with the level of the environmental sound, the direction to the sound source producing the environmental sound and the determination result indicating whether the environmental sound is a voice or a non-voice, as the environmental sound information.

The environmental sound collected by the microphone group 22 is supplied to the voice determination unit 33, and also supplied to and temporarily stored in the environmental sound storage unit 24A as described above.

In step S12, the situation analyzer 34 analyzes the surrounding situation around the TV based on the face information from the face information acquisition unit 32 and the environmental sound information from the voice determination unit 33 and supplies the analyzed surrounding situation to the volume/gain controller 35, and the processing goes to step S13.

In step S13, the volume/gain controller 35 controls the speaker controller 36 according to the surrounding situation from the situation analyzer 34 to perform the sound output control for controlling the output of the sound from the TV, that is, for example, the volumes of the speakers 15L and 15R, the gain of the sounds output from the speakers 15L and 15R and the like, and the processing goes to step S14.

In step S14, the volume/gain controller 35 determines whether the user has operated the sound adjustment key which is provided to the operating unit 17 and operated when the output of the sound from the TV is adjusted.

When it is determined in step S14 that the sound adjustment key is not operated, the processing skips step S15 and returns to step S11 to repeat the same processing.

When it is determined in step S14 that the sound adjustment key is operated, that is, when the user has operated the sound adjustment key and thus a volume operation signal corresponding to the operation of the sound adjustment key is supplied from the controller 16 (FIG. 1) to the volume/gain controller 35, the processing goes to step S15, the volume/gain controller 35 performs sound adjustment key operation reflecting/registering processing by which the operation of the sound adjustment key is reflected to the output of the sound of the TV and operation information on the operation concerned is registered (stored) into the storage unit 24, and the processing returns to step S11.

Here, "the volume/gain controller 35 reflects the operation of the sound adjustment key to the output of the sound of the TV in step S15" means that the volume/gain controller 35 controls the output of the sound from the TV by controlling the speaker controller 36 according to the operation of the sound adjustment key (the volume operation signal).

Figure 4:
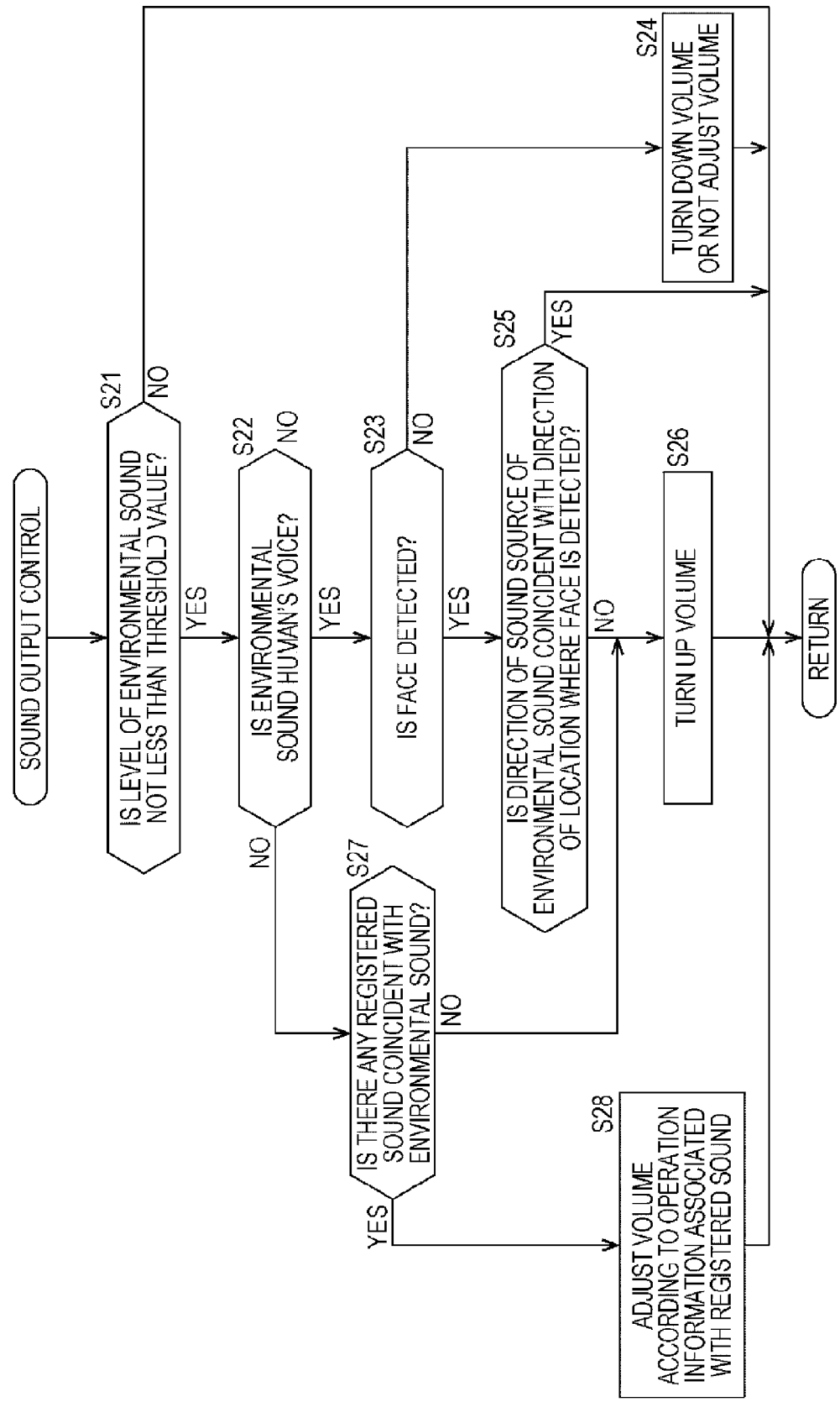
FIG. 4 is a flowchart explaining sound output control processing carried out by a volume/gain controller 35.

FIG. 4 is a flowchart explaining the sound output control processing in accordance with the surrounding situation carried out by the volume/gain controller 35.

In step S21, the volume/gain controller 35 determines based on the surrounding situation whether the level of the environmental sound around the TV is not less than a predetermined threshold value.

When it is determined in step S21 that the level of the environmental sound is less than the threshold value, that is, when no environmental sound which disturbs watching of a program occurs around the TV, the processing is returned.

When it is determined in step S21 that the level of the environmental sound is not less than the threshold value, that is, when there is a probability that an environmental sound disturbing watching of a program occurs around the TV, the processing goes to step S22, and the volume/gain controller 35 determines based on the surrounding situation whether the environmental sound level of which is not less than the threshold value is a human's voice or not.

When it is determined in step S22 that the environmental sound level of which is not less than the threshold value (hereinafter referred to as "large level environmental sound") is a human's voice, the processing goes to S23, and the volume/gain controller 35 determines based on the surrounding situation whether a face is detected from a taken image.

When it is determined in step S23 that no face is detected from the taken image, that is, in case of a situation where a human's talking voice is heard around the TV but there is no person watching a program around the TV, the processing goes to step S24, the volume/gain controller 35 performs the sound output control for turning down the volumes of the speakers 15L and 15R, and the processing returns.

For example, a situation where a user watching a program receives a phone call and has a telephone conversation at a place which is slightly distant from the TV or a situation where the user turns his/her face to a room located in the direction which is entirely different from the direction to the TV (camera 21) and talks with his/her family member in the room concerned is considered as the situation where a human's voice is heard around the TV but no person exists around the TV.

In this case, the user is not watching the program, and the voice (sound) of the program output from the TV may disturb a telephone call or a conversation which the user has. Therefore, the volume/gain controller 35 performs the sound output control for turning down the volumes of the speakers 15L and 15R. Accordingly, the sound output from the TV can be prevented from disturbing the telephone call or the conversation which the user has.

When the volumes of the speakers 15L and 15R during execution of the processing of step S24 are originally small, the sound output control for adjusting the volumes may not be executed in step S24.

On the other hand, when it is determined in step S23 that a face is detected from the taken image, that is, when the face or faces of one or more persons are displayed on the taken image taken by the camera 21, the processing goes to step S25, and the volume/gain controller 35 determines based on the surrounding situation whether the direction to a sound source producing an environmental sound that is a voice and the direction to the position where the face is detected with respect to the TV are (regarded as being) coincident with each other.

When it is determined in step S25 that the direction to the sound source producing the environmental sound that is the voice is coincident with the direction to the position where any face (of one or more faces) is detected, that is, in case of a situation where the user is watching a program and the user watching the program himself/herself has a conversation, the processing is returned.

Here, a situation where the user watching the program has a conversation about the program (with another user) is considered as the situation where the user is watching the program and the user has a conversation.

In this case, the volumes of the speakers 15L and 15R are not adjusted (kept unchanged).

Furthermore, when it is determined in step S25 that the direction to the sound source producing the environmental sound that is the voice is not coincident with the direction to the position where the face is detected, that is, in case of a situation where the user is watching a program, but a talking voice of a person other than the user is heard around the TV, the processing goes to step S26, the volume/gain controller 35 performs the sound output control for turning up the volumes of the speakers 15L and 15R, and the processing returns.

That is, a situation where a user who is not watching a program is making some noise at a place slightly distant from the TV (a place at which the user concerned is not displayed on the taken image) though there is a user watching the program is considered as the situation where the user is watching the program but a talking voice of a person other than the user is heard around the TV.

In this case, the voice of the user who is making some noise without watching the program may disturb the program watching by the user who is watching the program, and thus the volume/gain controller 35 performs the sound output control for turning up the volumes of the speakers 15L and 15R. Accordingly, the user who is watching the program can watch the program without being disturbed by the user who is making some noise without watching the program.

That is, when the user who is not watching the program produces a voice which disturbs the watching of the program, the volumes of the speakers 15L and 15R are adjusted to be turned up. Therefore, the user who is watching the program can watch the program while hearing the sound with the same degree of easiness before and after the user who is not watching the program produces a voice.

On the other hand, when it is determined in step S22 that the environmental sound level of which is not less than the threshold value (large level environmental sound) is not a human's voice, that is, when the large level environmental sound is a non-voice such as a call sound of a telephone or an interphone or the like, the processing goes to step S27, and the volume/gain controller 35 determines whether a registered sound which is (regarded as being) coincident with the environmental sound that is the non-voice (large level environmental sound) exists in registered sounds described later which are registered (stored) in the storage unit 24.

Here, when the user operates the sound adjustment key of the operating unit 17 (FIG. 1) and the volume/gain controller 35 performs the sound output control according to the operation of the sound adjustment key, the operation information concerning the operation of the sound adjustment key and the environmental sound just before the sound adjustment key is operated are registered in the storage unit 24 in association with each other.

The registered sound means an environmental sound which is registered in the storage unit 24 in association with the operation information as described above.

When it is determined in step S27 that there is no registered sound which is coincident with the environmental sound that is the non-voice, the processing goes to step S26, and the volume/gain controller 35 performs the sound output control for turning up the volumes of the speakers 15L and 15R so that the watching of the program by the user is not disturbed by the environmental sound that is the non-voice, and the processing returns.

When it is determined in step S27 that there is a registered sound coincident with the environmental sound that is the non-voice, the processing goes to step S28, the volume/gain controller 35 reads out the operation information associated with the registered sound coincident with the environmental sound that is the non-voice from the storage unit 24, and performs the sound output control for adjusting the volumes of the speakers 15L and 15R according to (the operation of the sound adjustment key represented by) the operation information, and the processing returns.

As described above, in the sound output controller 14, the surrounding situation around the TV is analyzed based on the taken image obtained by taking the surroundings of the TV and the environmental sound around the TV, and the sound output from the TV is controlled according to the surrounding situation. Therefore, the output of the sound can be properly controlled.

That is, for example, when a talking voice is heard around the TV on which the user is watching a program and the talking voice is from a telephone conversation which a family member living together or the like has at a place out of a room where the TV is placed, it is determined in step S25 of FIG. 4 that the direction to the sound source and the direction to the position where the face is detected are not coincident with each other, and the volume from the TV is adjusted to be larger. Therefore, the user who is watching a program can be prevented from being disturbed in program watching by the telephone conversation which the family member living together or the like has.

Furthermore, when the talking voice heard around the TV is a voice produced by the user who is watching a program on the TV, it is determined in step S25 of FIG. 4 that the direction to the sound source and the direction to the position where the face is detected are coincident with each other, and the volume from the TV is not adjusted (kept unchanged). Therefore, the adjustment of the volume from the TV in a case where the user does not feel any need to adjust the volume can be prevented.

Figure 5:
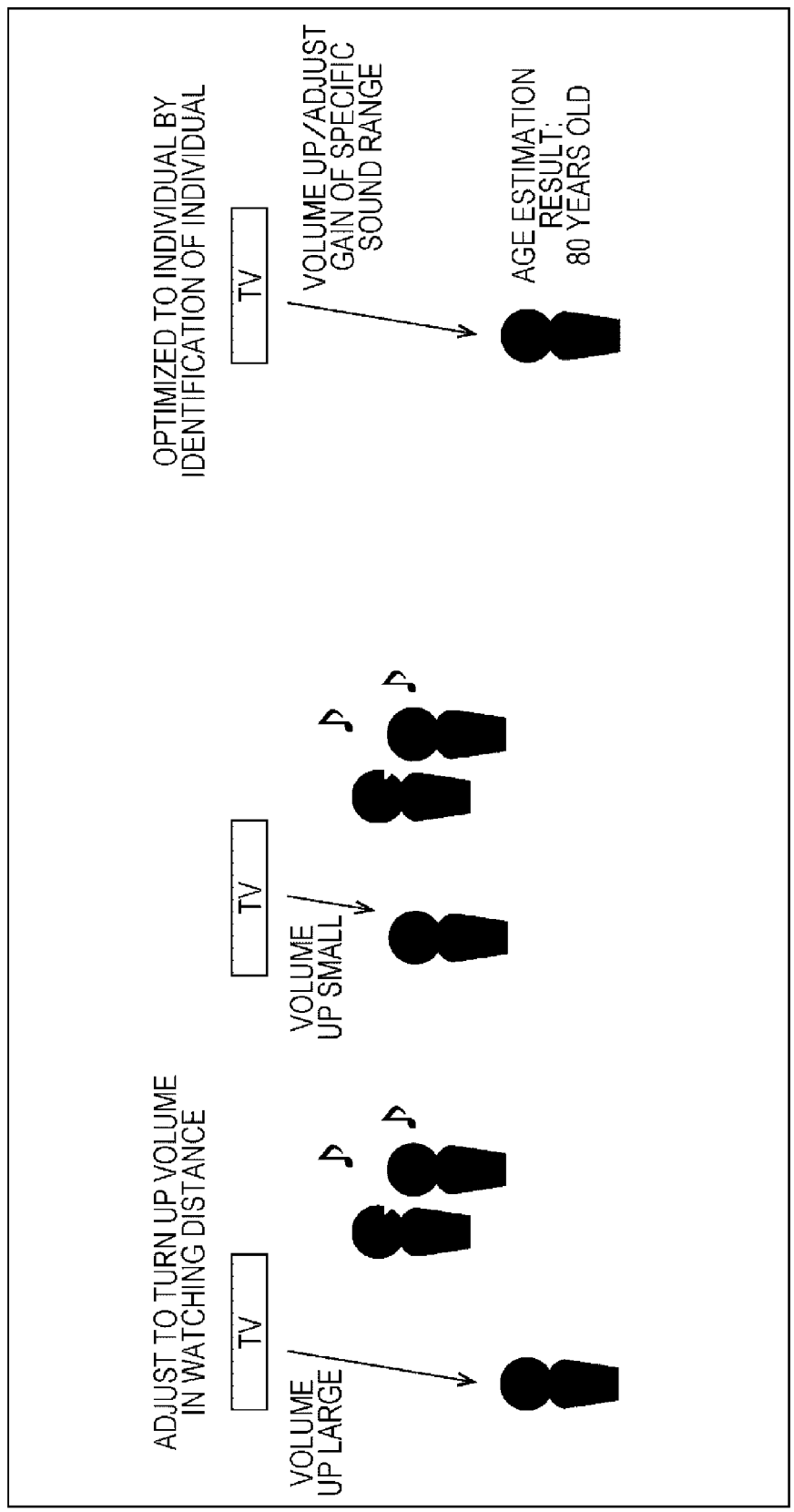
FIG. 5 is a diagram explaining the sound output control executed by the volume/gain controller 35.

FIG. 5 is a diagram explaining the sound output control executed by the volume/gain controller 35 of FIG. 2.

As described with reference to FIGS. 3 and 4, the volume/gain controller 35 performs the sound output control for adjusting the sound from the TV according to the surrounding situation around the TV. However, the sound output control can be performed according to the distance (from the TV) to a user who is watching a program (watching distance), a result of individual identification of a user who is watching a program or the like in addition to the surrounding situation around the TV.

That is, in a case where the watching distance is long (not less than a predetermined threshold value), an adjustment amount by which the volume is turned up can be set to be larger than a preset default adjustment amount (turn up the volume more greatly), for example, when the volume is turned up.

Furthermore, in a case where the watching distance is short (less than the predetermined threshold value), the adjustment amount by which the volume is turned up can be set to be smaller than the default adjustment amount, for example, when the volume is turned up.

Still furthermore, for example when the age of a program-watching user which is obtained as a result of the individual identification of the user is an advanced age of not less than 80, the adjustment amount by which the volume is turned up can be set to be larger than the default adjustment amount, for example, when the volume is turned up. In this case, in place of the turn-up of the volume (or in addition to the turn-up of the volume), the gain of frequency components which are difficult for advanced age people to hear can be increased.

Figure 6:
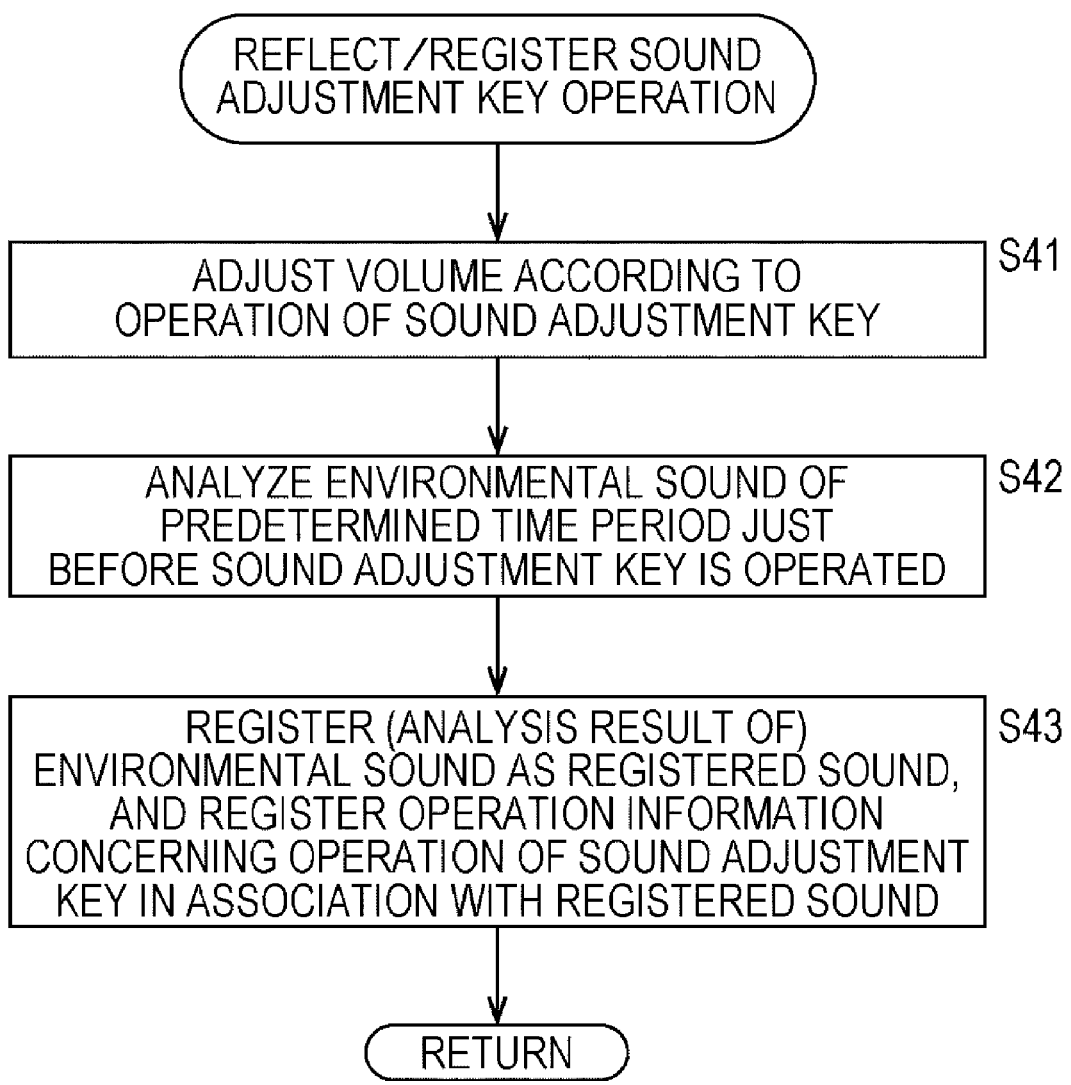
FIG. 6 is a flowchart explaining processing of reflecting/registering a sound adjustment key operation.

FIG. 6 is a flowchart explaining the sound adjustment key operation reflecting/registering processing that is carried out by the volume/gain controller 35, by which the operation of the sound adjustment key is reflected to the sound output from the TV and the operation information concerning the operation concerned is registered (stored) into the storage unit 24.

In step S41, the volume/gain controller 35 performs the sound output control for adjusting the volume according to the operation of the sound adjustment key that is determined to be operated by the user in step S14 of FIG. 3, and the processing goes to step S42.

That is, for example when the user operates the sound adjustment key so as to turn up the volume by only two steps or the like, the volume/gain controller 35 performs the sound output control for turning up the volume by only the two steps according to the operation concerned.

In step S42, the volume/gain controller 35 reads out an environmental sound for a fixed time period just before the sound adjustment key is operated (hereinafter referred to as "environmental sound just before operation") from the environmental sound storage unit 24A in which the latest environmental sound for a predetermined time period is stored, and analyzes the environmental sound just before operation, and the processing goes to step S43.

In step S43, the volume/gain controller 35 registers (an analysis result of) the environmental sound just before operation into the storage unit 24 as a registered sound in association with the operation information concerning the operation of the sound adjustment key, and the processing returns.

Here, as described with reference to steps S27 and S28 of FIG. 4, when a registered sound which is (regarded as being) coincident with an environmental sound that is a non-voice (large level environmental sound) exists in registered sounds registered in the storage unit 24, the volume/gain controller 35 adjusts the volume according to the operation information associated with the registered sound.

Accordingly, in a case where the user has ever adjusted the volume by only a predetermined adjustment amount (including muting) through user's operation of the sound adjustment key just after an environmental sound occurred, the same adjustment of the volume which has ever been carried out is carried out without any user's operation of the sound adjustment key when a similar environmental sound afterwards occurs.

That is, the TV can exhibits a so-called learning function as if the TV remembers the operation of the sound adjustment key carried out by the user.

As described with reference to steps S27 and S28 of FIG. 4, in a case where the adjustment of the volume is carried out in the volume/gain controller 35 according to the operation information associated with the registered sound which is registered in the storage unit 24 and coincident with the environmental sound, the volume can be adjusted to be returned to the original one when the environmental sound coincident with the registered sound vanishes afterwards.

Likewise, even in a case where the volume is adjusted in steps S24, S26 and S28 of FIG. 4 or the volume is adjusted according to the user's operation of the sound adjustment key in step S41 of FIG. 6, the volume may be subjected to restoration processing as adjustment processing for returning the volume to an original one when the surrounding situation returns to an original one before the volume is adjusted.

Figure 7:
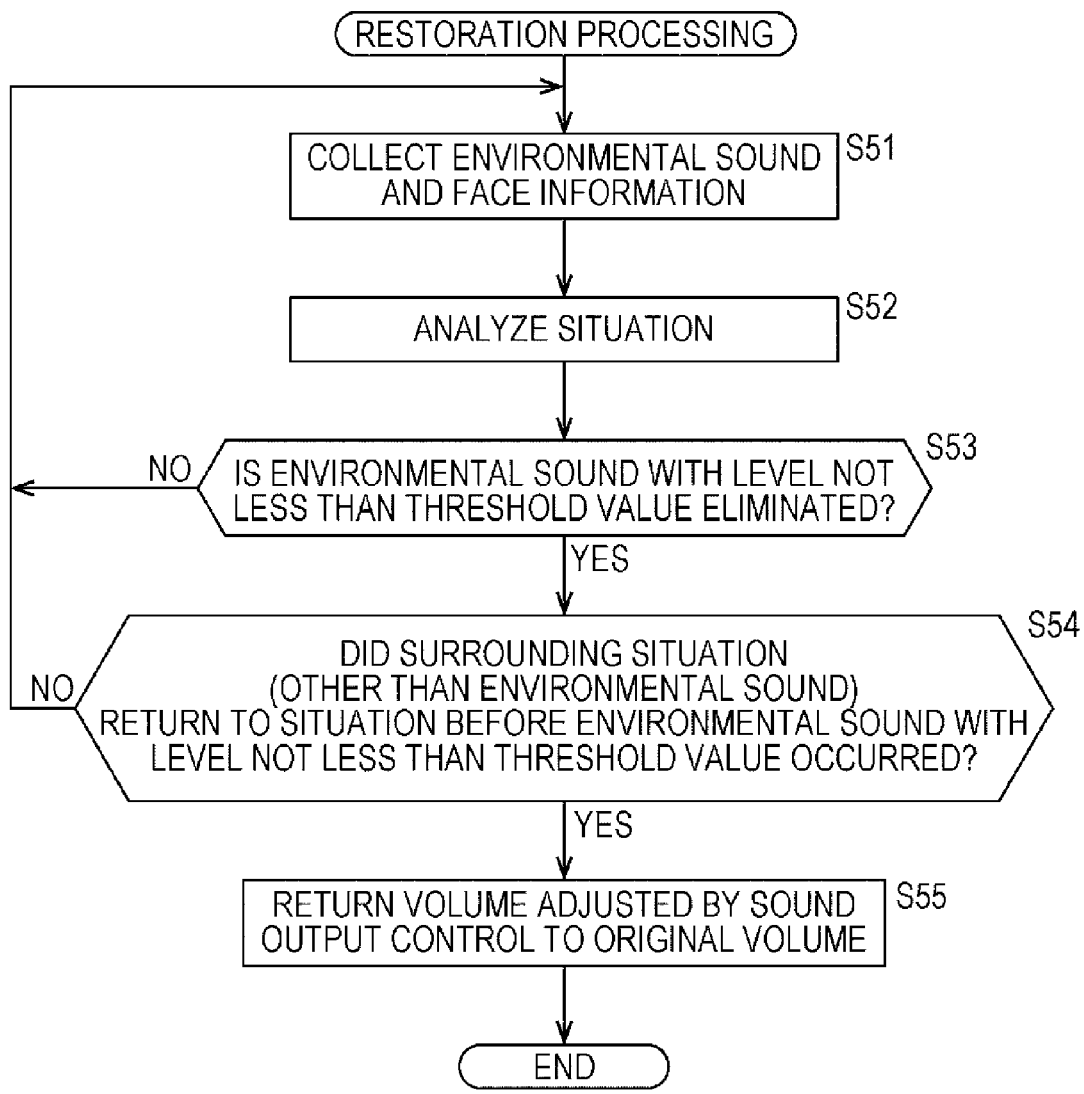
FIG. 7 is a flowchart explaining restoration processing.

FIG. 7 is a flowchart explaining the restoration processing for returning the volume adjusted in steps S24, S26 and S28 of FIG. 4 to the original one.

The restoration processing of FIG. 7 is started when the volume is adjusted in steps S24, S26 and S28 of FIG. 4.

In the storage unit 24 (FIG. 2), the latest surrounding situation for a fixed time period obtained by the situation analyzer 34 is stored, and a surrounding situation just before an occurrence of a large level environmental sound which causes the adjustment of the volume in steps S24, S26 and S28 of FIG. 4 (an original surrounding situation before the large level environmental sound occurs) out of the latest surrounding situation is stored until the restoration processing is finished.

In the sound output controller 14 (FIG. 2), the face information acquisition unit 32 collects face information and the voice determination unit 33 collects environmental sound information in step S51 as in step S11 of FIG. 3, and the processing goes to step S52.

In step S52, the situation analyzer 34 analyzes the surrounding situation around the TV on the basis of the face information obtained by the face information acquisition unit 32 and the environmental sound information obtained by the voice determination unit 33 as in step S12 of FIG. 3 and supplies the analyzed surrounding situation to the volume/gain controller 35, and the processing goes to step S53.

Here, the processing of steps S51 and S52 of FIG. 7 can be substituted by the processing of steps S11 and S12 of FIG. 3.

In step S53, the volume/gain controller 35 determines on the basis of the surrounding situation from the situation determination unit 34 whether the environmental sound level of which is determined to be not less than the threshold value in step S21 of FIG. 4 (the large level environmental sound) vanishes or not.

When it is determined in step S53 that the large level environmental sound does not vanish, the processing returns to step S51.

When it is determined in step S53 that the large level environmental sound vanishes, the processing goes to step S54, and the volume/gain controller 35 determines whether the surrounding situation from the situation determination unit 34 has returned to the situation stored in the storage unit 24 (original situation) before the environmental sound level of which is not less than the threshold value (large level environmental sound) occurs.

When it is determined in step S54 that the surrounding situation from the situation determination unit 34 has not returned to the original situation before the large level environmental sound occurs, the processing returns to step S51.

Furthermore, when it is determined in step S54 that the surrounding situation from the situation determination unit 34 has returned to the original situation before the large level environmental sound occurs, the processing goes to step S55, the volume/gain controller 35 performs the sound output control for returning the volume adjusted in steps S24, S26 or S28 of FIG. 4 to the original volume, and the restoration processing is finished.

There is a case where a user operates the sound adjustment key because of a change in the surrounding situation. Even in a case where the user operates the sound adjustment key because of a change in the surrounding situation and thus the volume is adjusted according to the operation of the sound adjustment key in step S41 of FIG. 6, the volume/gain controller 35 can return the volume to the original volume as in the case of the restoration processing of FIG. 7 when the surrounding situation afterwards returns to the original situation before the volume is adjusted (the situation before the change).

Figure 8:
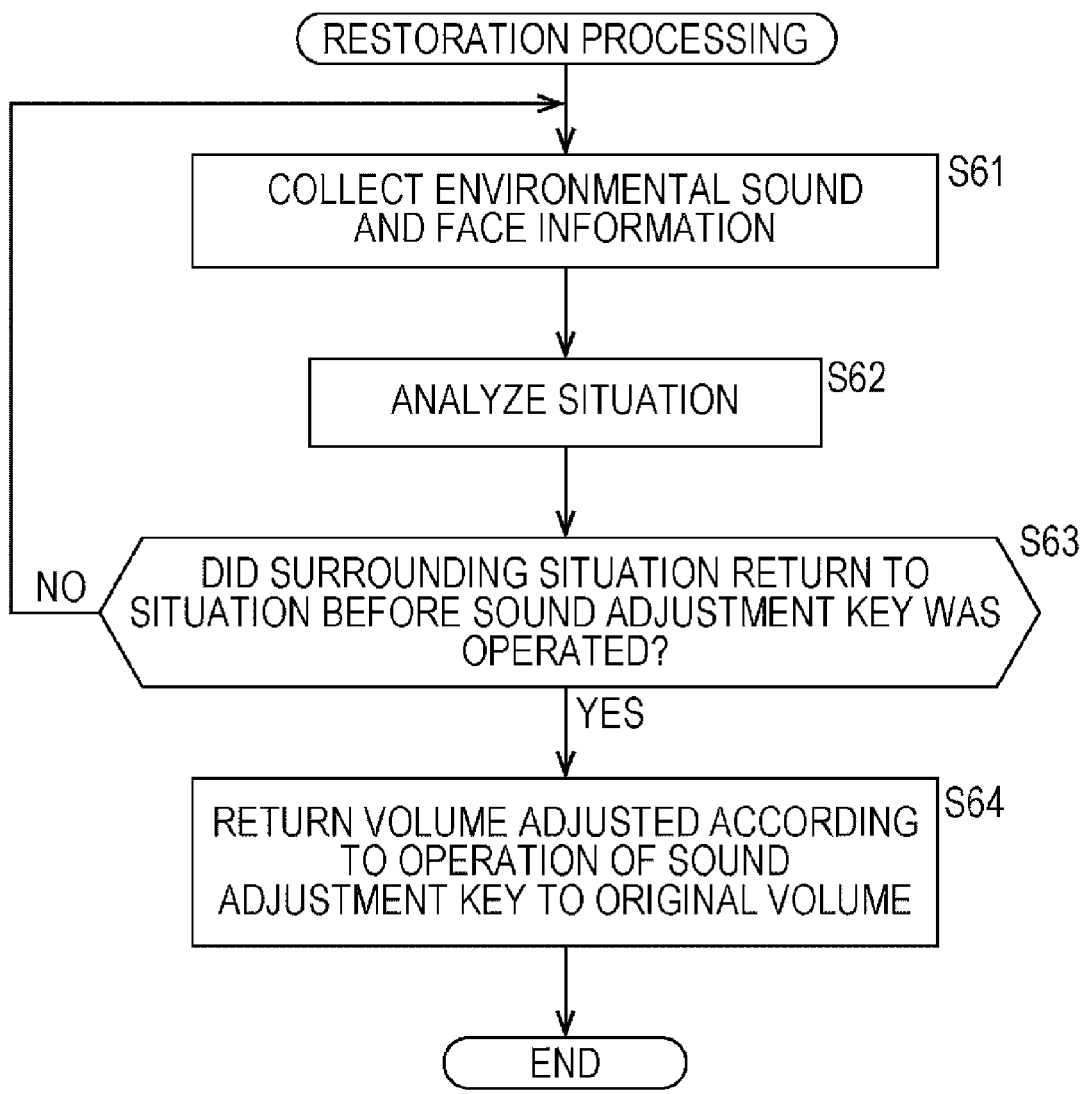
FIG. 8 is a flowchart explaining the restoration processing.

FIG. 8 is a flowchart explaining the restoration processing for returning the volume adjusted in step S41 of FIG. 6 to the original volume.

The restoration processing of FIG. 8 is started when the volume is adjusted in step S41 of FIG. 6.

As in the case of FIG. 7, in the storage unit 24 (FIG. 2), the latest surrounding situation for a fixed time period is stored, and the surrounding situation before the change when the user operates the sound adjustment key because of the change in the surrounding situation (when the sound adjustment key is operated just after the surrounding situation is changed) is selected from the latest surrounding situation and stored until the restoration processing of FIG. 8 is finished.

As in the case of step S11 of FIG. 3, in the sound output controller 14 (FIG. 2), the face information acquisition unit 32 collects the face information and the voice determination unit 33 collects the environmental sound information in step S61, and the processing goes to step S62.

In step S62, the situation analyzer 34 analyzes the surrounding situation around the TV on the basis of the face information obtained by the face information acquisition unit 32 and the environmental sound information obtained by the voice determination unit 33 as in the case of step S12 of FIG. 3 and supplies the analyzed surrounding situation to the volume/gain controller 35, and the processing goes to step S63.

Here, the processing of steps S61 and 62 of FIG. 8 may be substituted by the processing of steps S11 and S12 of FIG. 3.

In step S63, the volume/gain controller 35 determines whether the surrounding situation from the situation determination unit 34 has returned to the situation stored in the storage unit 24 before the change (original situation).

When it is determined in step S63 that the surrounding situation from the situation determination unit 34 has not returned to the original situation, the processing returns to step S61.

When it is determined in step S63 that the surrounding situation from the situation determination unit 34 has returned to the original situation, the processing goes to step S64, the volume/gain controller 35 performs the sound output control for returning the volume adjusted in step S41 of FIG. 6 to the original volume, and the restoration processing is finished.

FIG. 9 is a diagram explaining another example of the sound output control executed by the volume/gain controller 35 of FIG. 2.

In a case where the environmental sound is, for example, a calling sound of an interphone or a telephone and the environmental sound is determined to be a non-voice in the voice determination unit 33 (the result of the determination of the environmental sound indicates a non-voice), when no face is detected from a taken image (the number of faces detected from the taken image is zero), a situation where a user only listens to the sound of a program without watching the image and wants to stably listen to the sound of the program is considered as a situation around the TV (surrounding situation).

In this case, the volume/gain controller 35 can perform the sound output control for turning up the volume.

When the environmental sound is a non-voice as described above and a face is detected from the taken image (the number of faces detected from the taken image is one or more), a situation where the user is watching a program and wants to stably listen to the sound of the program is considered as the surrounding situation around the TV.

In this case, the volume/gain controller 35 can also perform the sound output control for turning up the volume.

In a case where the environmental sound is, for example, a human conversation or the like and the voice determination unit 33 determines that the environmental sound is a voice (the result of the determination of the environmental sound indicates a voice), when no face is detected from a taken image (the number of faces detected from the taken image is zero), a situation where a user is not watching any program and has a conversation over the telephone or the like is considered as the surrounding situation around the TV.

In this case, the volume/gain controller 35 can perform the sound output control for turning down the volume so as to prevent the sound of a program output from the TV from disturbing the user's conversation.

In a case where the environmental sound is a voice as described above, when a face is detected from a taken image (the number of faces detected from the taken image is one or more) and the direction to a sound source producing the voice that is an environmental sound is coincident with the direction to the position of the face (any face) detected from the taken image, a situation where a user has a conversation over the telephone or the like while watching a program is considered as the surrounding situation around the TV.

In this case, the volume/gain controller 35 may keep the volume unchanged without adjusting the volume, that is, may not perform the sound output control.

In a case where the environmental sound is a voice as described above, when a face is detected from a taken image and the direction to a sound source producing the voice that is an environmental sound is not coincident with the direction to the position of the face (any face) detected from the taken image, a situation where there exist a user watching a program and a user having a conversation without watching any program (without watching the TV side) is considered as the surrounding situation around the TV.

In this case, the volume/gain controller 35 can perform the sound output control for turning up the volume so that the program watching by the user who is watching the program is prevented from being disturbed by the conversation of the user who is not watching the program.

Furthermore, irrespective of the environmental sound or the detection of the face from the taken image, the sound output control for turning down the volume can be performed during the nighttime (a time period set as nighttime) so as to prevent the sound from traveling beyond the wall of the room where the TV is placed and reaching another room, for example.

The sound output control for reducing or increasing the gain of a predetermined frequency band of the sound of a program can be performed by the volume/gain controller 35 in place of the sound output control for turning down or up the volume (or together with such sound output control).

For example, when the environmental sound is a non-voice, a frequency band having a high gain (hereinafter referred to as "high gain band") in the non-voice is detected by analyzing the frequency characteristic of the non-voice, and the gain of the high gain band of the sound of the program is increased, so that the non-voice as noise can be equivalently subjected to noise-canceling.

Furthermore, as described above, when the sound is prevented from traveling beyond the wall of the room where the TV is placed and reaching another room in the nighttime, the sound output control for reducing (suppressing) the gain in a bass tone of the sound of the program can be performed.

A manner for adjusting the gain of each frequency component of the sound of the program can be changed in accordance with, for example, modes of the TV such as a game mode and a theater (cinema) mode or a category of a content as a program (for example, a sport program or the like) displayed (output) on the TV.

<Description of Computer to which Present Technology is Applied>

Next, a series of processing described above may be carried out by hardware or software. When the series of processing is carried out by software, a program constituting the software is installed in a general-purpose computer or the like.

FIG. 10 illustrates a configuration example of an embodiment of a computer in which the program for executing the series of processing described above is installed.

The program may be recorded in a hard disk 105 or a ROM 103 as a recording medium contained in the computer in advance.

Alternatively, the program may be stored (recorded) in a removable recording medium 111. Such a removable recording medium 111 may be provided as so-called package software. Here, a flexible disk, a CD-ROM (Compact Disc Read Only Memory), a MO (Magneto Optical) disk, a DVD (Digital Versatile Disc), a magnetic disk, a semiconductor memory and the like are known as the removable recording medium 111.

In addition to the install of the program from the removable recording medium 111 described above into the computer, the program may be downloaded into the computer via a communication network or a broadcasting network and installed into the hard disk 105 contained in the computer. That is, for example, the program may be wirelessly transmitted from a download site to the computer via an artificial satellite for digital satellite broadcasting or transmitted to the computer via a network such as LAN (Local Area network) or the Internet through a cable.

The computer contains a CPU (Central Processing Unit) 102, and an input/output interface 110 is connected to the CPU 102 via a bus 101.

When the user operates an input unit 107 or the like to input an instruction through the input/output interface 110, the CPU 102 executes a program stored in the ROM (Read Only Memory) 103 according to the instruction. Alternatively, the CPU 102 loads a program stored in the hard disk 105 into a RAM (Random Access Memory) 104 and executes the program.

Accordingly, the CPU 102 carries out the processing in accordance with the flowchart described above or the processing to be executed by the configuration of the block diagram described above. Via the input/output interface 110, the CPU 102 outputs the processing result from the output unit 106, transmits the processing result from a communication unit 108, records the processing result into the hard disk 105 or the like as necessary for example.

The input unit 107 is constituted by a keyboard, a mouse, a microphone and the like. The output unit 106 is constituted by an LCD (Liquid Crystal Display), a speaker and the like.

Here, in this specification, the processing carried out according to the program by the computer is not necessarily required to be carried out in time-series in accordance with an order described as a flowchart. That is, the processing carried out according to the program by the computer includes processing to be carried out in parallel or individually (for example, parallel processing or object-based processing).

The program may be processed by one computer (processor) or dispersively processed by plural computers. Furthermore, the program may be transmitted to and executed by a remote computer.

The embodiment of the present technology is not limited to the above-described embodiment, and various modifications may be made without departing from the subject matter of the present technology.

That is, the present technology may be applied to an output device for outputting at least sounds other than a TV.

In this embodiment, the program received by the tuner 11 is set as a processing target. However, according to the present technology, in addition to programs received by the tuner 11, contents recorded in a recorder, contents supplied from servers on a network such as the Internet and the like may be set as processing targets.

When the user operates the sound adjustment key in step S24 or S26 of FIG. 4 to return the adjustment of the volume to original one after adjustment of the volume, the surrounding situation at that time can be registered in the storage unit 24 (learned). In subsequent step S24 or S26, the adjustment of the volume may not be performed (can be limited) when the surrounding situation is coincident with the situation stored in the storage unit 24.

In a case where the volume is adjusted without user's operation of the sound adjustment key in step S24, S26 or S28 of FIG. 4, it may make the user feel uncomfortable if the volume is adjusted with no announcement. Therefore, a message indicating execution of the volume adjustment may be displayed on the display unit 13 (or output from the speaker unit 15 with voices).

Here, ON/OFF of the display (output) of the message indicating the execution of the volume adjustment may be switched by user's operation of the operating unit 17.

Furthermore, in the processing of reflecting/registering the sound adjustment key operation of FIG. 6, the operation information on the operation of the sound adjustment key is registered in the storage unit 24 in association with the environmental sound for a fixed time period just before the sound adjustment key is operated (the environmental sound just before operation) in step S43. However, the registration of the operation information into the storage unit 24 may be performed in association with not only the environmental sound just before operation, but also a result of individual identification, a time period, a source of a program displayed on the TV (input source) and the like.

In a case where the operation information on the operation of the sound adjustment key is registered in the storage unit 24 in association with the environmental sound just before operation, the result of individual identification and the like, a user watching a program is recognized based on the result of individual identification or the like, and the volume adjustment can be performed according to the operation of the sound adjustment key which is different for each user even when the same environmental sound just before operation occurs.

Here, in a case where the operation information on the operation of the sound adjustment key is registered in the storage unit 24 in association with the result of individual identification, the time period and the input source as well as the environmental sound just before operation, when an environmental sound just before operation and the like which are wholly identical to a new environmental sound just before operation and the like associated with the operation information have been already registered in the storage unit 24, a set of the operation information and the new environmental sound just before operation and the like is registered in the storage unit 24 so as to be overwritten on the identical environmental sound just before operation and the like.

The present technology can be configured as follows.

(1) An information processing apparatus comprising:
a processor that:
receives captured image data and captured sound data corresponding to an environment in which content is reproduced;
detects a user based on the captured image data;
analyzes a situation of the environment based on a result of the detection and the captured sound data; and
controls an audio volume corresponding to reproduced content based on a result of the analyzing.

(2) The information processing apparatus of (1), wherein
the processor receives the captured image data from a camera positioned in the environment in which content is reproduced and detects a face based on the captured image data.

(3) The information processing apparatus of (1), wherein
the processor receives the sound data from a microphone positioned in the environment in which content is reproduced (4) The information processing apparatus of (2), wherein
the processor detects a position corresponding to the detected face based on the captured image data.

(5) The information processing apparatus of (2), wherein
the processor detects a plurality of faces based on the captured image data.

(6) The information processing apparatus of (2) wherein
the processor determines face information corresponding to the detected face, the face information including at least one of an individual, age and gender.

(7) The information processing apparatus of (1), wherein
the processor determines a sound level corresponding to the captured sound data.

(8) The information processing apparatus of (1), wherein
the processor determines a direction corresponding to a source of the captured sound data.

(9) The information processing apparatus of (1), wherein
the processor determines whether the captured sound data is a human's voice or a sound other than a human's voice.

(10) The information processing apparatus of (1), wherein
the analyzing includes determining whether a sound level corresponding to the captured sound data is greater than or equal to a predetermined threshold value.

(11) The information processing apparatus of (10), wherein
the processor controls the audio volume corresponding to the reproduced content to remain unchanged when it is determined that the level is less than the predetermined threshold value.

(12) The information processing apparatus of (10), wherein
the processor determines whether the captured sound data is a human's voice or a sound other than a human's voice when it is determined that the level is greater than the predetermined threshold value.

(13) The information processing apparatus of claim 12, wherein
the processor controls the audio volume corresponding to the reproduced content to be lowered when it is determined that the captured sound data is a human's voice and a face is not detected based on the captured image data.

(14) The information processing apparatus of (12), wherein
the processor determines a direction corresponding to a source of the captured sound data when it is determined that the captured sound data is a human's voice and a face is detected based on the captured image data.

(15) The information processing apparatus of (14), wherein
the processor controls the audio volume corresponding to the reproduced content to remain unchanged when it is determined that the direction corresponding to the source of the captured sound is coincident with a location of a face detected based on the captured image data.

(16) The information processing apparatus of (14), wherein
the processor controls the audio volume corresponding to the reproduced content to increase when it is determined that the direction corresponding to the source of the captured sound is not coincident with a location of a face detected based on the captured image data.

(17) The information processing apparatus of (12), wherein
the processor determines whether the captured sound data corresponds to an environmental sound registered in advance when it is determined that the captured sound data is determined to be a sound other than a human's voice.

(18) The information processing apparatus of (17), wherein
the processor controls the audio volume corresponding to the reproduced content to increase when it is determined that the captured sound data corresponds to an environmental sound that is registered in advance.

(19) The information processing apparatus of (17), wherein
the processor controls the audio volume corresponding to the reproduced content based on previously stored settings corresponding to the environmental sound when it is determined that the captured sound data corresponds to the environmental sound stored in advance.

(20) A method performed by an information processing apparatus, the method comprising:

receiving captured image data and captured sound data corresponding to an environment in which content is reproduced;
detecting a user based on the captured image data;
analyzing a situation of the environment based on a result of the detection and the captured sound data; and
controlling an audio volume corresponding to reproduced content based on a result of the analyzing.

(21) A non-transitory computer-readable medium including computer-program instructions, which when executed by an information processing apparatus, cause the information processing apparatus to perform a method comprising:
receiving captured image data and captured sound data corresponding to an environment in which content is reproduced;
detecting a user based on the captured image data;
analyzing a situation of the environment based on a result of the detection and the captured sound data; and
controlling an audio volume corresponding to reproduced content based on a result of the analyzing.

REFERENCE SIGNS LIST

11 Tuner
12 Signal processor
13 Display unit
14 Sound output controller
15 Speaker unit
15L, 15R Speaker
16 Controller
17 Operating unit
21 Camera
22 Microphone group
23 Controller
24 Storage unit
24A Environmental sound storage unit
31 Face detector
32 Face information acquisition unit
33 Voice determination unit
34 Situation analyzer
35 Volume/gain controller
36 Speaker controller
101 Bus
102 CPU
103 ROM
104 RAM
105 Hard disk
106 Output unit
107 Input unit
108 Communication unit
109 Drive
110 Input/output interface
111 Removable recording medium

The invention claimed is:

1. An information processing apparatus comprising:
an input circuit for reception of capture image data and captured sound data corresponding to an environment in which content is reproduced;
a processor that:
processes the captured image data and the captured sound data corresponding to the environment in which content is reproduced;
detects a user based on the captured image data;
analyzes a situation of the environment based on a result of the detection and the captured sound data;
determines a direction in the captured image data to a source of the captured sound data;
determines if the direction in the captured image data to the source of the captured sound data is coincident with a location of a face of a human detected in the captured image data; and
controls an audio volume corresponding to reproduced content based on a result of the analyzing,
wherein
when a sound level corresponding to the captured sound data is greater than or equal to a predetermined threshold value,
the processor controls the audio volume corresponding to the reproduced content to remain unchanged when it is determined that the direction in the captured image data corresponding to the source of the captured sound data which is a human voice is coincident with the location of the face detected in the captured image data, and
the processor controls the audio volume corresponding to the reproduced content to increase when the processor determines that the direction in the captured image data corresponding to the source of the captured sound data which is a human voice is not coincident with the location of the face detected in the captured image data,
when the processor increases the audio volume when the processor determined that the direction in the captured image data corresponding to the source of the captured sound data which is a human voice is not coincident with the location of the face detected in the captured image data, the processor determines a volume increase amount based on the captured image data of a distance between the location of the detected user and the source of the captured sound data, and
in an event of a manual adjustment of a setting, the processor once an environmental situation is over automatically returns to a previous setting before the environmental situation occurred.

2. The information processing apparatus of claim 1, wherein the processor receives the captured image data from a camera positioned in the environment in which content is reproduced and detects the face based on the captured image data.

3. The information processing apparatus of claim 2, wherein
the processor detects a position corresponding to the detected face based on the captured image data.

4. The information processing apparatus of claim 2, wherein
the processor detects a plurality of faces based on the captured image data.

5. The information processing apparatus of claim 2 wherein
the processor determines face information corresponding to the detected face, the face information including at least one of an individual, age and gender.

6. The information processing apparatus of claim 1, wherein
the processor receives the sound data from a microphone positioned in the environment in which content is reproduced.

7. The information processing apparatus of claim 1, wherein
the processor determines a sound level corresponding to the captured sound data.

8. The information processing apparatus of claim 1, wherein the processor determines whether the captured sound data is a human's voice or a sound other than a human's voice.

9. The information processing apparatus of claim 1, wherein
the processor controls the audio volume corresponding to the reproduced content to remain unchanged when it is determined that the level is less than the predetermined threshold value.

10. The information processing apparatus of claim 1, wherein
the processor determines whether the captured sound data is a human's voice or a sound other than a human's voice when it is determined that the level is greater than the predetermined threshold value.

11. The information processing apparatus of claim 10, wherein
the processor controls the audio volume corresponding to the reproduced content to be lowered when it is determined that the captured sound data is a human's voice and a face is not detected based on the captured image data.

12. The information processing apparatus of claim 10, wherein
the processor determines a direction corresponding to a source of the captured sound data when it is determined that the captured sound data is a human's voice and a face is detected based on the captured image data.

13. The information processing apparatus of claim 10, wherein
the processor determines whether the captured sound data corresponds to an environmental sound registered in advance when it is determined that the captured sound data is determined to be a sound other than a human's voice.

14. The information processing apparatus of claim 13, wherein
the processor controls the audio volume corresponding to the reproduced content to increase when it is determined that the captured sound data corresponds to an environmental sound that is registered in advance.

15. The information processing apparatus of claim 13, wherein
the processor controls the audio volume corresponding to the reproduced content based on previously stored settings corresponding to the environmental sound when it is determined that the captured sound data corresponds to the environmental sound stored in advance.

16. The information processing apparatus of claim 1, wherein the processor determines an age of the detected user and, when the processor controls the audio volume to increase, the processor applies an increased gain to a predetermined audio frequency band.

17. A method performed by an information processing apparatus, the method comprising:
receiving captured image data and captured sound data corresponding to an environment in which content is reproduced;
detecting a user based on the captured image data;
determining a direction in the captured image data to the source of the captured sound data;
determining if the direction in the captured image data to the source of the captured sound data is coincident with a location of a face of a human detected in the captured image data;
analyzing a situation of the environmental based on a result of the detection and the captured sound data; and
controlling an audio volume corresponding to reproduced content based on a result of the analyzing, wherein
when a sound level corresponding to the captured sound data is greater than or equal to a predetermined threshold value,
the controlling includes controlling the audio volume corresponding to the reproduced content to remain unchanged when it is determined that the direction in the captured image data corresponding to the source of the captured sound data which is at human voice is coincident with the location of the face detected in the captured image data, and
the controlling includes controlling the audio volume corresponding to the reproduced content to increase when the direction in the captured image data corresponding to the source of the captured sound data which is human voice is not coincident with the location of the face detected in the captured image data,
when the controlling includes controlling the audio volume to increase when the direction in the captured image date corresponding to the source of the captured sound data which is a human voice is not coincident with the location of the face detected in the captured image data, the controlling further includes determining a volume increase amount based on the captured image data of a distance between the location of the detected user and the source of the captured sound data, and
in an event of a manual adjustment of a setting, the controlling once an environmental situation is over automatically returns to a previous setting before the environmental situation occurred.

18. The method of claim 17, further comprising determining an age of the detected user and, when the controlling includes controlling the audio volume to increase, the controlling includes applying an increased gain to a predetermined audio frequency band.

19. A non-transitory computer-readable medium including computer-program instructions, which when executed by an information processing apparatus, cause the information processing apparatus to perform a method comprising:
receiving captured image data and captured sound data corresponding to an environment in which content is reproduced;
detecting a user based on the captured image data;
determining a direction in the captured image data to the source of the captured sound data;
determining if the direction in the captured image data to the source of the captured sound data is coincident with a location of a face of a human detected in the captured image data;
analyzing a situation of the environment based on a result of the detection ad the captured sound data; and
controlling an audio volume corresponding to reproduced content based on a result of the analyzing, wherein
when a sound level corresponding to the captured sound data is greater than or equal to a predetermined threshold value,
the controlling includes controlling the audio volume corresponding to the reproduced content to remain unchanged when it is determined that the direction in the captured image data corresponding to the source of the captured sound data which is a human voice is coincident with the location of the face detected in the captured image data, and
the controlling includes controlling the audio volume corresponding to the reproduced content to increase when the direction corresponding to the source of the captured sound data which is a human voice is not coincident with the location of the face detected in the captured image data, and when the controlling includes controlling the audio volume to increase when the direction in the captured image data corresponding to the source of the captured sound data which is a human voice is not coincident with the location of the face detected in the captured image data, the controlling further includes determining a volume increased amount based on the captured image data of a distance between the location of the detected user and the source of the captured sound data, and in an event of a manual adjustment of a setting, the controlling once an environmental situation is over automatically returns to a previous setting before the environmental situation occurred.

20. The non-transitory computer-readable medium according to claim 19, further comprising determining an age of the detected user and, when the controlling includes controlling the audio volume to increase, the controlling includes applying an increased gain to a predetermined audio frequency band.

* * * * *